US009322565B2

(12) United States Patent
Weaver et al.

(10) Patent No.: US 9,322,565 B2
(45) Date of Patent: Apr. 26, 2016

(54) SYSTEMS, METHODS AND APPARATUS FOR WEATHER-BASED PRECONDITIONING

(71) Applicant: Google Inc., Mountain View, CA (US)

(72) Inventors: Jason C. Weaver, Austin, TX (US); Bradley A. Kayton, Hollis, NH (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/475,029

(22) Filed: Sep. 2, 2014

(65) Prior Publication Data
US 2014/0371923 A1 Dec. 18, 2014

Related U.S. Application Data

(63) Continuation of application No. 13/327,459, filed on Dec. 15, 2011, which is a continuation of application No. 12/241,588, filed on Sep. 30, 2008, now Pat. No. 8,160,752.

(51) Int. Cl.
G05D 23/19 (2006.01)
F24F 11/00 (2006.01)
(Continued)

(52) U.S. Cl.
CPC ........... *F24F 11/006* (2013.01); *F24F 11/0009* (2013.01); *G05B 15/02* (2013.01);
(Continued)

(58) Field of Classification Search
CPC . G05D 1/66; G05D 23/1927; G05D 23/1917; F24F 11/006; F24F 11/0009; F24F 2011/0058; G06Q 10/06314; G06Q 50/06; H04W 74/00; H04W 4/12; H04L 67/10; H04L 12/2827; H04L 41/22; H04L 12/2816; H04L 12/12; H04L 12/2829; H04Q 9/00; H04Q 2209/43; H04Q 2209/60; H04Q 2209/30; H02J 3/14; H02J 2003/143; H02J 3/00; Y02B 60/33; Y02B 60/34; Y02B 70/325; Y04S 20/228; G05B 15/02; G05F 1/66
USPC ........ 700/276, 277, 295, 296; 236/1 C, 44 C, 236/46 R, 47, 49.36, 51, 91 D
See application file for complete search history.

(56) References Cited

U.S. PATENT DOCUMENTS 3,991,357 A 11/1976 Kaminski
4,117,537 A 9/1978 Muench
(Continued)

FOREIGN PATENT DOCUMENTS

CA 2202008 2/2000
EP 196069 12/1991
(Continued)

OTHER PUBLICATIONS

Aprilaire Electronic Thermostats Model 8355 User's Manual, Research Products Corporation, Dec. 2000, 16 pages.
(Continued)

*Primary Examiner* — Charles Kasenge
(74) *Attorney, Agent, or Firm* — Kilpatrick Townsend & Stockton LLP

(57) ABSTRACT

Accessing an energy management policy for a plurality of devices is described, wherein the devices are coupled with a first structure. The energy usage of the devices is monitored. An energy usage rule and energy usage is then compared. The energy management policy and energy usage is also compared. Based on the comparing, an instruction is generated to modify an energy usage profile of said device to correlate with the energy usage rule associated with the devices and the energy management policy, thereby enabling efficient energy management.

20 Claims, 6 Drawing Sheets

(51) Int. Cl.

| | | |
|---|---|---|
| *H02J 3/14* | (2006.01) | |
| *H04L 12/12* | (2006.01) | |
| *H04L 12/28* | (2006.01) | |
| *H04Q 9/00* | (2006.01) | |
| *G06Q 50/06* | (2012.01) | |
| *H04L 29/08* | (2006.01) | |
| *H04W 4/12* | (2009.01) | |
| *H04L 12/24* | (2006.01) | |
| *H04W 74/00* | (2009.01) | |
| *G06Q 10/06* | (2012.01) | |
| *G05F 1/66* | (2006.01) | |
| *G05B 15/02* | (2006.01) | |
| *H02J 3/00* | (2006.01) | |

(52) U.S. Cl.
CPC ........ *G05D23/1917* (2013.01); *G05D 23/1927* (2013.01); *G05F 1/66* (2013.01); *G06Q 10/06314* (2013.01); *G06Q 50/06* (2013.01); *H02J 3/00* (2013.01); *H02J 3/14* (2013.01); *H04L 12/12* (2013.01); *H04L 12/2816* (2013.01); *H04L 12/2827* (2013.01); *H04L 12/2829* (2013.01); *H04L 41/22* (2013.01); *H04L 67/10* (2013.01); *H04Q 9/00* (2013.01); *H04W 4/12* (2013.01); *H04W 74/00* (2013.01); *F24F 2011/0058* (2013.01); *H02J 2003/143* (2013.01); *H04Q 2209/30* (2013.01); *H04Q 2209/43* (2013.01); *H04Q 2209/60* (2013.01); *Y02B 60/33* (2013.01); *Y02B 60/34* (2013.01); *Y02B 70/325* (2013.01); *Y04S 20/228* (2013.01)

(56) References Cited

U.S. PATENT DOCUMENTS

| | | | |
|---|---|---|---|
| 4,183,290 A | 1/1980 | Kucharczyk | |
| 4,223,831 A | 9/1980 | Szarka | |
| 4,324,987 A | 4/1982 | Sullivan et al. | |
| 4,335,847 A | 6/1982 | Levine | |
| 4,408,711 A | 10/1983 | Levine | |
| 4,567,557 A | 1/1986 | Burns | |
| 4,615,380 A | 10/1986 | Beckey | |
| 4,674,027 A | 6/1987 | Beckey | |
| 4,685,614 A | 8/1987 | Levine | |
| 4,751,961 A | 6/1988 | Levine et al. | |
| 4,897,798 A | 1/1990 | Cler | |
| 5,086,385 A | 2/1992 | Launey et al. | |
| 5,088,645 A | 2/1992 | Bell | |
| 5,211,332 A | 5/1993 | Adams | |
| 5,240,178 A | 8/1993 | Dewolf et al. | |
| 5,244,146 A | 9/1993 | Jefferson et al. | |
| 5,289,362 A | 2/1994 | Liebl et al. | |
| 5,395,042 A | 3/1995 | Riley et al. | |
| 5,436,510 A | 7/1995 | Gilbert | |
| 5,476,221 A | 12/1995 | Seymour | |
| 5,499,196 A | 3/1996 | Pacheco | |
| 5,555,927 A | 9/1996 | Shah | |
| 5,611,484 A | 3/1997 | Uhrich | |
| 5,808,294 A | 9/1998 | Neumann | |
| 5,875,430 A | 2/1999 | Koether | |
| 5,902,183 A | 5/1999 | D'Souza | |
| 5,909,378 A | 6/1999 | De Milleville | |
| 5,918,474 A | 7/1999 | Khanpara et al. | |
| 5,962,989 A | 10/1999 | Baker | |
| 5,971,597 A | 10/1999 | Baldwin et al. | |
| 5,977,964 A | 11/1999 | Williams et al. | |
| 6,062,482 A | 5/2000 | Gauthier et al. | |
| 6,066,843 A | 5/2000 | Scheremeta | |
| 6,072,784 A | 6/2000 | Agrawal et al. | |
| 6,095,427 A | 8/2000 | Hoium et al. | |
| 6,098,893 A | 8/2000 | Berglund et al. | |
| 6,108,685 A | 8/2000 | Kutzik et al. | |
| 6,216,956 B1 * | 4/2001 | Ehlers ................. | F24F 11/006 236/47 |
| 6,349,883 B1 | 2/2002 | Simmons et al. | |
| 6,356,204 B1 | 3/2002 | Guindi et al. | |
| 6,370,894 B1 | 4/2002 | Thompson et al. | |
| 6,396,531 B1 | 5/2002 | Gerszberg et al. | |
| 6,415,205 B1 | 7/2002 | Myron et al. | |
| 6,448,896 B1 | 9/2002 | Bankus et al. | |
| 6,478,233 B1 | 11/2002 | Shah | |
| 6,528,957 B1 | 3/2003 | Luchaco | |
| 6,591,620 B2 * | 7/2003 | Kikuchi et al. ................. | 62/126 |
| 6,645,066 B2 | 11/2003 | Gutta et al. | |
| 6,654,689 B1 | 11/2003 | Kelly et al. | |
| 6,769,482 B2 | 8/2004 | Wagner et al. | |
| 6,782,294 B2 * | 8/2004 | Reich et al. ..................... | 700/19 |
| 6,785,592 B1 | 8/2004 | Smith et al. | |
| 6,789,739 B2 * | 9/2004 | Rosen ............................. | 236/51 |
| 6,990,821 B2 | 1/2006 | Singh et al. | |
| 7,024,336 B2 | 4/2006 | Salsbury et al. | |
| 7,062,361 B1 * | 6/2006 | Lane ............................. | 700/295 |
| 7,149,727 B1 | 12/2006 | Nicholls et al. | |
| 7,149,729 B2 | 12/2006 | Kaasten et al. | |
| 7,185,504 B2 * | 3/2007 | Kasai et al. ..................... | 62/186 |
| 7,188,482 B2 | 3/2007 | Sadegh et al. | |
| 7,197,365 B2 | 3/2007 | Hori et al. | |
| 7,218,998 B1 | 5/2007 | Neale | |
| 7,225,171 B2 * | 5/2007 | Kikuchi et al. ................ | 705/412 |
| 7,232,075 B1 * | 6/2007 | Rosen ............................. | 236/51 |
| 7,274,975 B2 * | 9/2007 | Miller ........................... | 700/295 |
| 7,364,093 B2 * | 4/2008 | Garozzo ..................... | 236/46 R |
| 7,379,791 B2 | 5/2008 | Tamarkin et al. | |
| RE40,437 E | 7/2008 | Rosen | |
| 7,451,937 B2 * | 11/2008 | Flood et al. ..................... | 236/94 |
| 7,469,550 B2 | 12/2008 | Chapman, Jr. et al. | |
| 7,636,666 B2 | 12/2009 | van Putten et al. | |
| 7,644,869 B2 | 1/2010 | Hoglund et al. | |
| 7,702,424 B2 | 4/2010 | Cannon et al. | |
| 7,784,704 B2 | 8/2010 | Harter | |
| 7,802,618 B2 | 9/2010 | Simon et al. | |
| 7,839,275 B2 * | 11/2010 | Spalink et al. ................. | 340/501 |
| 7,848,900 B2 | 12/2010 | Steinberg et al. | |
| 7,849,698 B2 | 12/2010 | Harrod et al. | |
| 7,854,389 B2 | 12/2010 | Ahmed | |
| 8,010,237 B2 | 8/2011 | Cheung et al. | |
| 8,019,567 B2 | 9/2011 | Steinberg et al. | |
| 8,021,618 B1 | 9/2011 | Cooper | |
| 8,037,022 B2 | 10/2011 | Rahman et al. | |
| 8,078,330 B2 * | 12/2011 | Brickfield et al. ............ | 700/291 |
| 8,090,477 B1 | 1/2012 | Steinberg | |
| 8,091,375 B2 | 1/2012 | Crawford | |
| 8,131,497 B2 | 3/2012 | Steinberg et al. | |
| 8,160,752 B2 | 4/2012 | Weaver et al. | |
| 8,174,381 B2 | 5/2012 | Imes et al. | |
| 8,180,492 B2 | 5/2012 | Steinberg | |
| 8,219,249 B2 | 7/2012 | Harrod et al. | |
| 8,423,322 B2 | 4/2013 | Steinberg et al. | |
| 8,457,796 B2 * | 6/2013 | Thind ................... | G05B 15/02 236/47 |
| 2001/0013123 A1 | 8/2001 | Freeman et al. | |
| 2002/0124992 A1 * | 9/2002 | Rainer et al. .................. | 165/11.1 |
| 2003/0036810 A1 | 2/2003 | Petite | |
| 2003/0066897 A1 | 4/2003 | Carner et al. | |
| 2003/0070438 A1 * | 4/2003 | Kikuchi et al. ................. | 62/141 |
| 2003/0150916 A1 * | 8/2003 | Rosen ............................. | 236/51 |
| 2003/0167150 A1 | 9/2003 | Shimura et al. | |
| 2003/0192328 A1 * | 10/2003 | Kikuchi et al. ................. | 62/141 |
| 2003/0216837 A1 * | 11/2003 | Reich et al. ..................... | 700/276 |
| 2003/0233172 A1 | 12/2003 | Granqvist et al. | |
| 2003/0233201 A1 | 12/2003 | Horst et al. | |
| 2004/0117330 A1 | 6/2004 | Ehlers et al. | |
| 2004/0249479 A1 | 12/2004 | Shorrock | |
| 2005/0038571 A1 | 2/2005 | Brickfield et al. | |
| 2005/0040943 A1 | 2/2005 | Winick | |
| 2005/0049789 A1 | 3/2005 | Kelly et al. | |
| 2005/0090915 A1 | 4/2005 | Geiwitz | |
| 2005/0103874 A1 | 5/2005 | Erdman | |
| 2005/0120012 A1 | 6/2005 | Poth et al. | |
| 2005/0128067 A1 | 6/2005 | Zakrewski | |
| 2005/0150968 A1 | 7/2005 | Shearer | |
| 2005/0154495 A1 | 7/2005 | Shah | |
| 2005/0171645 A1 | 8/2005 | Oswald et al. | |

(56) References Cited

U.S. PATENT DOCUMENTS

| | | |
|---|---|---|
| 2005/0189429 A1 | 9/2005 | Breeden |
| 2005/0192915 A1 | 9/2005 | Ahmed et al. |
| 2005/0234596 A1* | 10/2005 | Rietschel ..................... 700/276 |
| 2005/0245839 A1 | 11/2005 | Stivoric et al. |
| 2005/0270151 A1 | 12/2005 | Winick |
| 2005/0280421 A1 | 12/2005 | Yomoda et al. |
| 2006/0065750 A1* | 3/2006 | Fairless ....................... 236/46 R |
| 2006/0080246 A1 | 4/2006 | Wyckoff |
| 2006/0111816 A1 | 5/2006 | Spalink et al. |
| 2006/0142900 A1 | 6/2006 | Rothman et al. |
| 2006/0186214 A1 | 8/2006 | Simon et al. |
| 2006/0196953 A1 | 9/2006 | Simon et al. |
| 2006/0259199 A1 | 11/2006 | Gjerde et al. |
| 2006/0276938 A1 | 12/2006 | Miller |
| 2007/0045431 A1 | 3/2007 | Chapman, Jr. et al. |
| 2007/0114295 A1* | 5/2007 | Jenkins .......................... 236/51 |
| 2007/0115902 A1 | 5/2007 | Shamoon et al. |
| 2007/0118831 A1 | 5/2007 | Kondo |
| 2007/0155379 A1* | 7/2007 | Shamoon et al. ............. 455/423 |
| 2007/0199336 A1* | 8/2007 | Tantot ............................. 62/157 |
| 2007/0205297 A1 | 9/2007 | Finkam et al. |
| 2007/0250386 A1 | 10/2007 | Wyckoff |
| 2008/0015742 A1 | 1/2008 | Kulyk et al. |
| 2008/0147205 A1* | 6/2008 | Ollis et al. ....................... 700/11 |
| 2008/0167756 A1 | 7/2008 | Golden et al. |
| 2008/0183335 A1 | 7/2008 | Poth et al. |
| 2008/0191045 A1 | 8/2008 | Harter |
| 2008/0273754 A1 | 11/2008 | Hick et al. |
| 2008/0277486 A1* | 11/2008 | Seem et al. .................. 236/49.3 |
| 2008/0281473 A1 | 11/2008 | Pitt |
| 2008/0282182 A1 | 11/2008 | Oosaka |
| 2008/0317292 A1 | 12/2008 | Baker et al. |
| 2009/0006873 A1 | 1/2009 | Bellofatto et al. |
| 2009/0018706 A1 | 1/2009 | Wittner |
| 2009/0050703 A1* | 2/2009 | Lifson et al. .................... 236/51 |
| 2009/0171862 A1 | 7/2009 | Harrod et al. |
| 2009/0240381 A1* | 9/2009 | Lane ............................. 700/296 |
| 2009/0254225 A1 | 10/2009 | Boucher et al. |
| 2009/0259713 A1 | 10/2009 | Blumrich et al. |
| 2009/0297901 A1 | 12/2009 | Kilian et al. |
| 2009/0327354 A1 | 12/2009 | Resnick et al. |
| 2010/0019051 A1 | 1/2010 | Rosen |
| 2010/0025483 A1 | 2/2010 | Hoeynck et al. |
| 2010/0063832 A1 | 3/2010 | Brown |
| 2010/0070084 A1 | 3/2010 | Steinberg et al. |
| 2010/0070086 A1 | 3/2010 | Harrod et al. |
| 2010/0070234 A1 | 3/2010 | Steinberg et al. |
| 2010/0082174 A1 | 4/2010 | Weaver et al. |
| 2010/0084482 A1 | 4/2010 | Kennedy et al. |
| 2010/0167783 A1 | 7/2010 | Alameh et al. |
| 2010/0179704 A1 | 7/2010 | Ozog |
| 2010/0211224 A1 | 8/2010 | Keeling et al. |
| 2010/0235004 A1* | 9/2010 | Thind .................... G05B 15/02 |
| | | 700/277 |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0035060 A1 | 2/2011 | Oswald |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0077896 A1 | 3/2011 | Steinberg et al. |
| 2011/0151837 A1 | 6/2011 | Winbush, III |
| 2011/0160913 A1 | 6/2011 | Parker et al. |
| 2011/0185895 A1 | 8/2011 | Freen |
| 2011/0307103 A1 | 12/2011 | Cheung et al. |
| 2011/0307112 A1 | 12/2011 | Barrilleaux |
| 2012/0017611 A1 | 1/2012 | Coffel et al. |
| 2012/0065935 A1 | 3/2012 | Steinberg et al. |
| 2012/0085831 A1 | 4/2012 | Kopp |
| 2012/0089269 A1 | 4/2012 | Weaver et al. |
| 2012/0101637 A1 | 4/2012 | Imes et al. |
| 2012/0158350 A1 | 6/2012 | Steinberg et al. |
| 2012/0221151 A1 | 8/2012 | Steinberg |
| 2012/0252430 A1 | 10/2012 | Imes et al. |

FOREIGN PATENT DOCUMENTS

| | | |
|---|---|---|
| JP | 59106311 | 6/1984 |
| JP | 01252850 | 10/1989 |
| WO | 02/49310 | 6/2002 |

OTHER PUBLICATIONS

Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online]. Ecobee, Mar. 2012 [retrieved on Feb. 25, 2013]. Retrieved from the Internet: <URL: https://www.ecobee.com/solutions/home/smart-si/>, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.

(56) References Cited

OTHER PUBLICATIONS

Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat, Honeywell International, Inc., Operating Manual, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Akhlaghinia et al., "Occupancy Monitoring in Intelligent Environment through Integrated Wireless Localizing Agents", IEEE, 2009, 7 pages.
Akhlaghinia et al., "Occupant Behaviour Prediction in Ambient Intelligence Computing Environment", Journal of Uncertain Systems, vol. 2, No. 2, 2008, pp. 85-100.
Allen et al., "Real-Time Earthquake Detection and Hazard Assessment by ElarmS Across California", Geophysical Research Letters, vol. 36, L00B08, 2009, pp. 1-6.
Chatzigiannakis et al., "Priority Based Adaptive Coordination of Wireless Sensors and Actors", [online] Q2SWinet '06, Oct. 2, 2006 [Retrieved on Mar. 12, 2012]. Retrieved from the Internet: <URL:http://dl.acm.org/citation.cfm?id=1163681>.
Deleeuw, "Ecobee WiFi Enabled Smart Thermostat Part 2: The Features Review", Retrieved from <URL:http://www.homenetworkenabled.com/content.php?136-ecobee-WiFi-enabled-Smart-Thermostat-Part-2-The-Features-review>, Dec. 2, 2011, 5 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Loisos et al., "Buildings End-Use Energy Efficiency: Alternatives to Compressor Cooling", California Energy Commission, Public Interest Energy Research, Jan. 2000, 80 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Mozer, "The Neural Network House: An Environmental that Adapts to its Inhabitants", AAAI Technical Report SS-98-02, 1998, pp. 110-114.
Ros et al., "Multi-Sensor Human Tracking with the Bayesian Occupancy Filter", IEEE, 2009, 8 pages.
Wong et al., "Maximum Likelihood Estimation of ARMA Model with Error Processes for Replicated Observations", National University of Singapore, Department of Economics, Working Paper No. 0217, 2002, 19 pages.
U.S. Appl. No. 12/241,588, Non-Final Office Action mailed on Oct. 13, 2010, 11 pages.
U.S. Appl. No. 12/241,588, Final Office Action mailed on Mar. 30, 2011, 15 pages.
U.S. Appl. No. 12/241,588, Notice of Allowance mailed on Sep. 16, 2011, 8 pages.

* cited by examiner

500

```
      ┌─────────┐
      │  Start  │
      └────┬────┘
           ▼
┌───────────────────────────────────────────┐
│ Monitor a signal of a device, wherein the │
│ signal is an energy usage signature       │
│ specific to the device and the            │
│ device is coupled with a first structure. │
│                    505                    │
└────────────────────┬──────────────────────┘
                     ▼
┌───────────────────────────────────────────┐
│ Generate an analysis of energy usage of   │
│ the device based on the monitoring, the   │
│ analysis describing an energy usage       │
│ profile of the device.                    │
│                    510                    │
└────────────────────┬──────────────────────┘
                     ▼
              ┌─────────┐
              │   End   │
              └─────────┘
```

FIG. 5

SYSTEMS, METHODS AND APPARATUS FOR WEATHER-BASED PRECONDITIONING

CROSS REFERENCES

This application is a Continuation application of and claims the benefit of U.S. patent application Ser. No. 13/327,459, filed on Dec. 15, 2011, entitled, "MANAGING ENERGY USAGE," which is a Continuation application of U.S. patent application Ser. No. 12/241,588, filed on Sep. 30, 2008, now U.S. Pat. No. 8,160,752 entitled "MANAGING ENERGY USAGE," which claims the benefit of U.S. Provisional Application No. 60/977,015 filed on Oct. 2, 2007, entitled "ENERGY MANAGEMENT PLATFORM." The entire disclosures of these applications are hereby incorporated by reference for all purposes.

FIELD

The field of the present invention relates to computer systems. More particularly, embodiments of the present invention relate to energy management systems.

BACKGROUND

Consumers experiment with different ways of reducing household energy usage. For example, consumers may turn off air conditioning during certain parts of the day, run certain appliances only during the early morning hours, and replace large inefficient appliances with smaller energy efficient ones. Additionally, consumers may use measuring devices to calculate the energy usage rate of a particular device. Then, depending upon the measured energy usage, a consumer may decide to turn the device on and off to adjust the home's overall energy usage.

However, there exist limitations as to the current system for measuring the energy usage of a particular device. While a device's energy usage may be determined for a given point in time, it is unclear what this determination means. For example, an energy usage measurement might specify that a device is using 2 kilowatts per hour. While this information may be useful to a scientist, the average consumer is not well acquainted with the kilowatt. Furthermore, it is not clear to the consumer what the 2 kilowatts per hour static measurement means in context with the energy usage of a possible new device, other devices, and/or the entire household of devices. Thus, current energy usage measurements are cryptic and not very useful to the average consumer.

BRIEF SUMMARY

Accessing an energy management policy for a plurality of devices is described, wherein the devices are coupled with a first structure. The energy usage of the devices is monitored. An energy usage rule and energy usage is then compared. The energy management policy and energy usage is also compared. Based on the comparing, an instruction is generated to modify an energy usage profile of said device to correlate with the energy usage rule associated with the devices and the energy management policy, thereby enabling efficient energy management.

BRIEF DESCRIPTION OF THE DRAWINGS

The accompanying drawings, which are incorporated in and form a part of this specification, illustrate embodiments of the present invention for managing energy usage and, together with the description, serve to explain principles discussed below:

FIG. 5 is a flowchart of an example method of managing energy usage in accordance with embodiments of the present invention.

Figure 1:
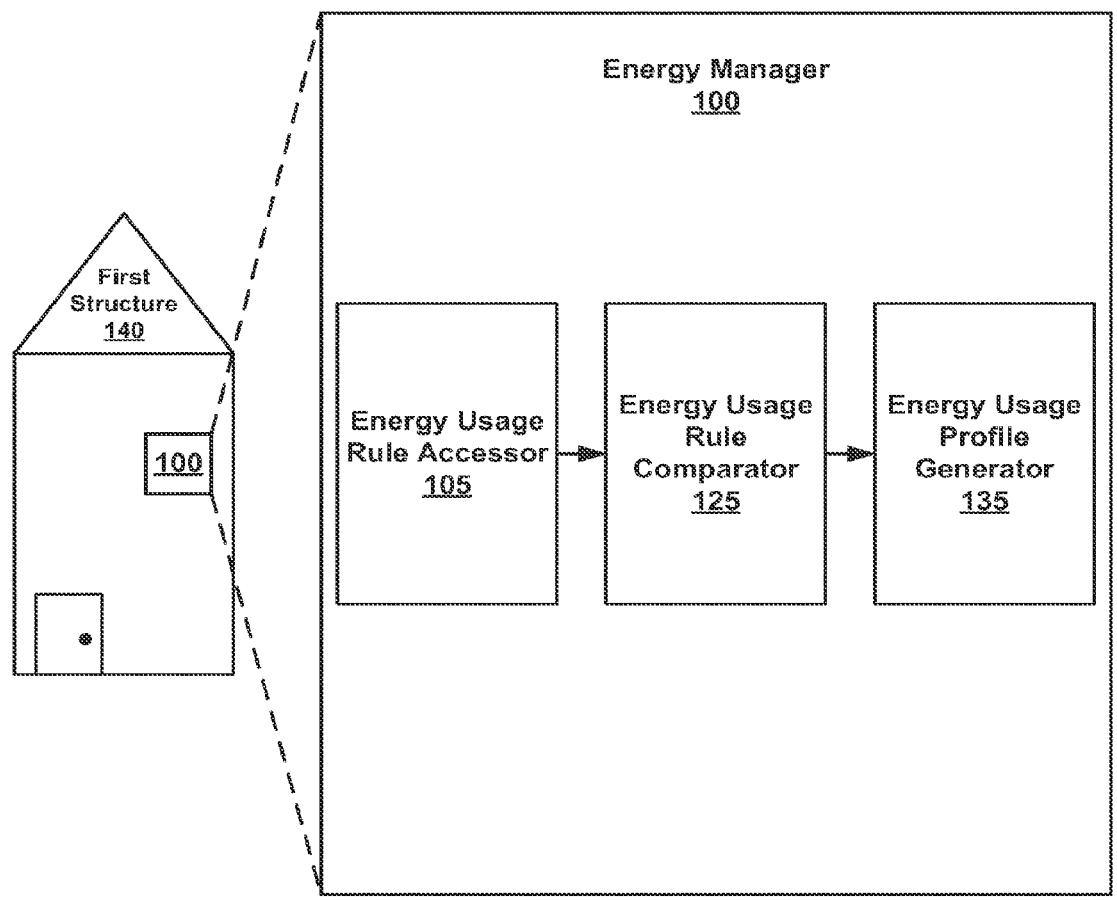
FIG. 1 is a block diagram of an example system for managing energy usage in accordance with embodiments of the present invention.

The drawings referred to in this description should not be understood as being drawn to scale unless specifically noted.

DESCRIPTION OF EMBODIMENTS

Reference will now be made in detail to embodiments of the present invention, examples of which are illustrated in the accompanying drawings. While the invention will be described in conjunction with various embodiment(s), it will be understood that they are not intended to limit the present invention to these embodiments. On the contrary, the present invention is intended to cover alternatives, modifications and equivalents, which may be included within the spirit and scope of the various embodiments as defined by the appended claims.

Furthermore, in the following detailed description, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "accessing", "monitoring", "comparing", "modifying", "enabling", "tracking", "generating", "estimating", "alerting", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Overview of Discussion

Embodiments in accordance with the present invention pertain to a system for managing energy usage. In one embodiment, the system described herein enables conservation of household energy by advising a user to modify the household's energy usage to correlate to a desired energy usage for that household.

More particularly, one embodiment of the present invention functions as a household energy manager. For example, the energy manager attaches to a household wall and replaces the typical heating-cooling thermostat controller. The energy manager then utilizes an energy-measuring module coupled with a household device to monitor the energy usage of the household device. For example, an energy-measuring module coupled with a dishwasher may measure a dishwasher utilizing 1.20 kilowatts per hour of electricity.

In addition to monitoring individual appliances, the energy manager may utilize an energy-measuring module, such as a smart meter, coupled with the house to monitor the total household's energy usage. For example, a smart meter may measure the overall energy usage of all appliances within a household, including the dishwasher, to be 21 kilowatts per hour of electricity.

The energy manager then may access an energy usage rule describing a desired energy usage for a device and/or the household. This energy usage rule may be preprogrammed and internal to the energy manager or may be accessed at a server positioned external to the energy manager. This server in turn may receive a demand-response call from an energy utility company. For example, a demand-response call may indicate that it is desirable that the aforementioned dishwasher is to use up to a maximum of 1.00 kilowatt per hour of electricity at any given time. Furthermore, an overall energy management policy may specify that the household may use up to a maximum of 20 kilowatts per hour of energy at any point in time.

Based on the comparison between the measured energy usage of a household device and that device's desired energy usage, the energy manager may modify the device's energy usage to conform with the overall desired energy usage. For example, based on the comparison between the dishwasher's measured 1.20 kilowatts per hour of energy usage, and the household's use of 21 kilowatts per hour of electricity, the energy manager may modify the dishwasher's energy usage by turning it off and on at time periods separate from other high energy usage appliances, to keep the overall household energy use below 20 kilowatts per hour at any given point in time.

Thus, an energy manager may utilize an internally preprogrammed energy usage rule and/or a demand-response call received via a server from an energy utility company to advise a user to modify a device's energy usage.

The following discussion will begin with a detailed description of the structure of components herein in accordance with the present invention. This discussion will then be followed by a detailed description of the operation and function of the components herein.

Energy Manager

FIG. 1 is a block diagram of an example energy manager 100 in accordance with embodiments of the present invention. Energy manager 100, coupled with first structure 140, comprises energy usage rule accessor 105, energy usage rule comparator 125, and energy usage profile generator 135

Figure 2:
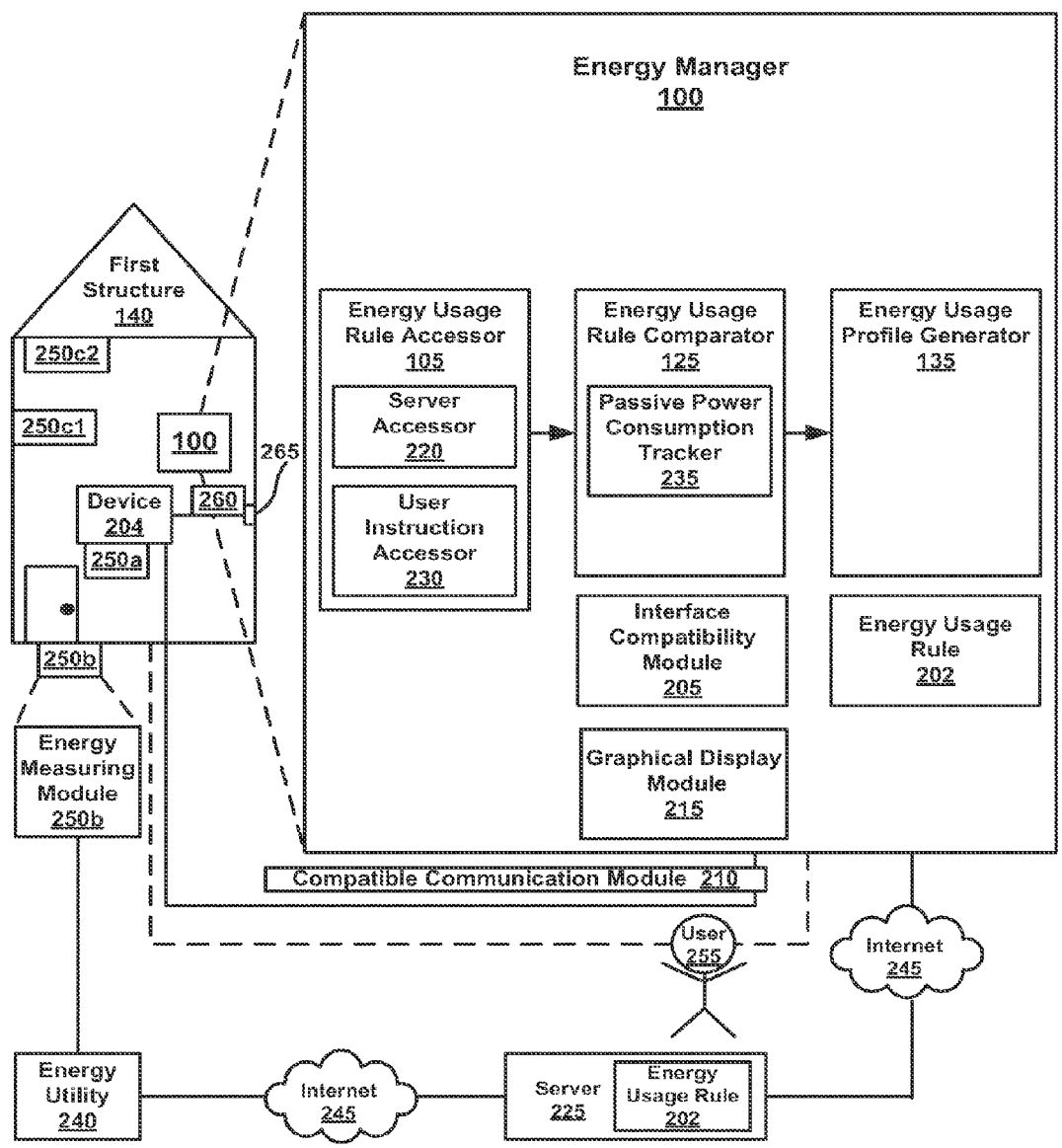
FIG. 2 is a block diagram of an example system for managing energy usage in accordance with embodiments of the present invention.

Continuing with FIG. 2, a block diagram is shown of an example energy manager 100 in which energy usage rule accessor 105 comprises server accessor 220 and user instruction accessor 230. In another embodiment, energy usage rule comparator 125 comprises passive power consumption tracker 235. In one embodiment, energy manager 100 further comprising interface compatibility module 205 and graphical display module 215.

Energy manager 100 is shown coupled wirelessly with device 204 via energy-measuring module 250a and compatible communication module 210. Of note, energy-measuring module 250a may be coupled with energy manager 100 in such a way as to be part of energy manager 100. Energy-measuring module 250a operates as an inductive donut surrounding the electrical cord that couples device 204 with an electrical outlet of first structure 140. As will be described herein, energy-measuring module 250a listens for information such as energy usage signatures specific to device 204. This information is communicated wirelessly to energy manager 100 via a wireless transmitter and receiver coupled with energy measuring module 250a and compatible communication module 210, such as but not limited to the wireless Ethernet, ZigBee, X10, or some other suitable wireless protocol.

In another embodiment, energy manager 100 is shown coupled wirelessly with energy-measuring module 250b. Energy-measuring module 250b may be a digital meter coupled with the outside of the home. Energy utility 240 has access to this digital meter. The digital meter provides information regarding the total energy usage of the household. This information is communicated wirelessly to energy manager 100 via a wireless transmitter and receiver coupled with energy-measuring module 250b and energy manager 100, such as such as but not limited to the wireless Ethernet, ZigBee, X10, or some other suitable wireless protocol.

In one embodiment, energy manager 100 is shown coupled wirelessly with energy-measuring modules 250c1 and 250c2 of a group of energy-measuring modules denoted as 250c, that are themselves coupled with subpanels positioned on the side wall and ceiling of first structure 140. Of note, in another embodiment, energy manager 100 may also be coupled with energy-measuring modules 250c1 and 250c2 via a wire. Additionally, energy manager 100 is well suited to being coupled with a plurality of more than two energy-measuring modules of energy-measuring module group 250c at any number of locations within first structure 140.

Energy-measuring modules 250c1 and 250c2 that are coupled with the subpanels and positioned in the proximity of device 204 listen for information such as energy usage signatures specific to device 204. For example, a certain amount of signal noise flows between and through energy-measuring modules 250c1 and 250c2. By identifying and comparing said signal noise received at energy-measuring modules 250c1 and 250c2, better granularity in reading the energy signature of device 204 can be obtained. The more 250c energy-measuring modules that are positioned at first structure 140, the more data that can be collected. The more data that can be collected, the more accurate is the determination of energy usage per device 204.

Of note, energy usage rule 202 may be any recommendation or instruction for energy usage as it relates to device 204, either alone, or as part of an energy management policy for one or more devices. In one embodiment, an energy management policy may designate the overall desired household energy usage as well as the desired energy usage for individual devices therein.

In one embodiment, energy usage rule 202 is preprogrammed within energy manager 100. In another embodiment, energy usage rule 202 is external to energy manager 100, located at server 225, and provided to server 225 via energy utility 240 or other Internet hosted servers. In one embodiment, server 225 acts as a central management server. Energy utility 240 is coupled with energy manager 100 via Internet 245 and server 225, and is coupled with first structure 140 via energy-measuring module 250b.

In another embodiment, unit 260 is coupled with device 204 and electrical outlet 265 with which device 204 is also coupled. Additionally, the present invention is well suited to having any number of units 260 coupled with any number of devices and any number of electrical outlets. Unit 260 is configured to receive an instruction to modify an energy usage profile of device 204 to correlate with device 204's energy usage rule. In essence, unit 260 may control the power to device 204. Of note, unit 260 may receive instructions to modify the energy usage profile of device 204 from any device capable of sending receivable instructions.

In one embodiment, an energy manager 100 coupled with a subpanel within first structure 140 wirelessly transmits an instruction to unit 260 to modify the energy usage profile of device 204. In another embodiment, user 255 may email an instruction to unit 260 to modify device 204 coupled therewith. More particularly, in one example, unit 260 is coupled with a lamp. Energy manager 100 sends a message to unit 260 that the lamp is utilizing too many kilowatts per hour of energy and needs to be turned down. Unit 260 then dims the lamp's lighting, thus decreasing the lamp's energy usage according to the instructions.

Continuing with FIG. 2, device 204 may be any device that may be coupled with first structure 140. Of note, device 204 may be any device capable of utilizing energy within first structure 140. However, for purposes of brevity and clarity, device 204 is sometimes referred to herein as "household device". For example, device 204 may be a washer, a dryer, a refrigerator, a dishwasher, a toaster, etc. Furthermore, first structure 140 may be any structure with which one or more devices may be coupled and within which one or more devices may use electricity. However, for purposes of brevity and clarity, first structure 140 is sometimes referred to herein as "household".

Operation

More generally, in embodiments in accordance with the present invention, energy manager 100 is used to monitor and instruct a user to modify the energy usage profile of one or more devices within a household to correlate to a desired energy usage for that device and/or household. In another embodiment, energy manager 100 is used to monitor and automatically modify the energy usage profile of one or more devices within a household to correlate to a desired energy usage for that device and/or household. Desired energy usage may be based on energy usage rules internal to energy manager 100 and/or energy usage rules ultimately received from an energy utility. Such an instruction and/or modification are particularly useful to conserve household energy usage.

More particularly, and referring to FIG. 2, in one embodiment, energy usage rule accessor 105 accesses an energy usage rule 202 of device 204, wherein device 204 is coupled with first structure 140. Then, energy usage rule comparator 125 receives an energy usage measurement of device 204 and compares energy usage rule 202 with the energy usage measurement. Next, energy usage profile generator 135 generates an instruction to modify an energy usage profile of device 204 to correlate with the energy usage, thereby enabling efficient energy management.

An energy usage measurement of one or more devices refers to the total amount of energy measured for each device and/or for cumulative devices within first structure 140. For example, energy-measuring module 250a measures energy through a study of a device's energy usage signature that vacillates with its energy usage. For example, every device that plugs into an electrical system has a unique energy usage signature. In other words, every device exhibits unique signal patterns during its electrical usage. These signals are used to calculate a total amount of energy being used at any given time by device 204.

An energy usage profile of device 204 refers to the overall energy usage of device 204 and device's 204 interaction with other devices within first structure 140, taking into account all available input, such as user 255 input, energy utility 240 input, and/or other input received via Internet 245 and server 225. Additionally, an energy usage profile of device 204 may be integrated with an energy usage profile of a device located within one or more structures other than first structure 140.

In one embodiment, energy usage rule accessor 105 comprises server accessor 220, configured for accessing an energy management instruction at server 225, wherein server 225 is positioned apart from first structure 140. Server 225 holds instructions received from energy utility 240. These instructions, for example, may command energy manager 100 to conserve energy relating to one or more structures that are subscribed to a demand response program. This command to conserve energy may take the form of an instruction to turn down a thermostat's set-point in the summer and to turn up the thermostat's set-point in the winter during critical peak energy draw situations. In essence, the instructions provide that the AC is to be turned down in the summer and that the heater is to be turned down in the winter at certain critical points in time.

However, "cheaters" could put a local heat source such as a match (in the summer) or a local cold source such as an ice-cube (in the winter) to attempt to trick the thermostat that the adjustment being made will have a positive effect on the energy load. Energy manager 100 may then profile the actual energy load reduction vs. the projected energy load reduction. If it is determined that the difference between the actual energy load reduction vs. the projected energy load reduction is too great, then a demand response situation may be triggered.

In a demand response situation, energy manager 100 may ignore the actual temperature reading and may alert authorities of the cheating. For example, when the demand response situation has been triggered and using sophisticated algorithms, energy manager 100 may determine the appropriate actions in proceeding with an energy load reduction, regardless of the energy manager 100's local temperature reading. Energy manager 100 may also flag a server 225 as to suspicious behavior for later follow-up by authorities.

In another embodiment, user instruction accessor 230 is configured for accessing an instruction from user 255, wherein the instruction provides guidance as to user's 255 desired energy usage for device 204. For example, in one embodiment, user 255 may input information into energy manager 100 such as to what temperature user 255 would like a room to remain for the next five hours.

In one embodiment, the user instruction is a result of a dialogue generated by energy manager 100 with user 255. For example, energy manager 100 may create a dialogue with user 255 via text and/or sound to learn how and when to automatically modify the in-home environment taking into account the comfort of user 255. Energy manager 100, for example, may interview user 255 to improve user's personal satisfaction with the HVAC and energy automation effectiveness. One or all of the available energy manager 100's available user interfaces may query, "Are you cold, hot, or just right now?" or "We made the assumption due to the time of day and day-in-the-month not to turn the heat on at this time to save you money . . . did you like the decision?" The answers to these queries may be used to create an energy usage profile of user 255 and the household.

After establishing a home owner's preference in temperature and pattern of usage, energy manager 100 may also factor in local weather conditions into pro-active plans for heating and cooling. For example, an Internet hosted server (coupled with server 225 via Internet 245) may provide forecasted weather data for the home in neighborhood, identifiable by zip code. Energy manager 100 may use the anticipation of a coming weather pattern, user preference knowledge, and scheduled or critical peak energy rates (actual or expected) to take pro-active steps. For example, these pro-active steps may include gradually cooling down the house to 65 degrees throughout the morning until 11 am, while taking into account that user's 255 disregard for the cold in the morning as well as taking advantage of cheaper energy rates.

In another embodiment, an instruction is generated to modify an energy usage profile of first device 204 coupled with first structure 140 according to an energy usage profile of a second device coupled with a second structure, such that the energy usage associated with first structure 140 and the energy usage associated with the second structure does not occur at the same time. For example, two different homes both have an energy manager 100, are coupled with server 225, and enter into a local grid "balancing algorithm". Home #1 wants to use its compressor. Home #2 wants to heat its swimming pool. If both homes use this type of energy at the same time, the power grid will be taxed with a cumulative amount of power usage. However, if the two homes stagger its energy usage, then the power grid's average usage will remain the same. In other words, when home #1 is done with using its compressor, the pool heater of home #2 will be recommended to be powered on.

For example, energy manager 100 of home #1 generates an instruction to the effect that home #1 should power on its compressor between the hours of 2 p.m. and 4 p.m. Energy manager 100 of home #2 generates an instruction to the effect that home #2 should power on its pool heater between the hours of 4 p.m. and 6 p.m. The residents of home #1 may then follow its energy manager 100's instructions. The residents of home #2 may also then follow its energy manager 100's instructions.

In another embodiment of the present invention, when home #1 is done with using its compressor, the pool heater of home #2 will automatically power on.

In other words, energy manager 100 causes "peak load management" to occur, in which some or all devices within a home may be turned off in critical peak power situations. This peak load management can be performed based on geography, such as but not limited to peak load management per house and peak load management per neighborhood.

In one embodiment of the present invention, energy manager 100 comprises interface compatibility module 205, configured for enabling coupling of energy manager 100 with compatible communication module 210, wherein energy manager 100 utilizes compatible communication module 210 to access an energy usage measurement. For example, interface compatibility module 205 provides a means of choosing the best method of Internet connectivity for user 255. It comprises a compatible communication module 210 that allows user 255 to buy a compatible wireless networking module, a household-wiring module, or other appropriate module that allows for further customization by user 255 to match user's 255 existing home network. For example, compatible communication module 210 enables the coupling of wireless connector 802.11 with energy manager 100. Wireless connector 802.11 then enables communication with energy measuring module 250a.

In another embodiment of the present invention, energy manager 100 comprises graphical display module 215, configured for enabling communication with user 255. For example, graphical display module 215 may include various aesthetic properties relating to color, texture, shape, and lighting. In one embodiment, graphical display module 215 may be a glass touch screen panel. The panel may be color and incorporate graphics. The panel may enable communication via icons, graphs, pie charts, etc.

In one embodiment, energy manager 100 generates an instruction that is receivable by a human user 255 of device 204. This instruction may be receivable through any number of mediums, including graphical display module 215 positioned as shown in FIG. 2 or positioned anywhere that enables coupling wired or wireless coupling with first structure 140. Additionally, human user 255 of device 204 may access the generated instruction at any device within first structure 140 that is configured to transmit the instruction, such as but not limited to a desktop computer and/or portable electronic devise. Further, human user 255 of device 204 may access the generated instruction as an email message, SMS message, or other electronic message via a device capable of supporting the transmission and display of the message. In another embodiment, energy manager 100 generates an instruction that is receivable by device 204. The instruction enables device 204 to alter its energy usage profile based on the comparing of the energy usage rule for device 204 and device 204's energy usage.

In one embodiment, energy manager 100 comprises passive power consumption tracker 235, configured for tracking a difference between the sum of energy usage of all devices, wherein all these devices are in an active state and coupled with first structure 140, and a total energy used within first structure 140 to generate a passive power consumption analysis. For example, energy manager 100 may provide calculated estimates of passive power consumption. The difference between the sum of each appliance's energy usage and the total energy usage is per household is passive power consumption and untracked power usage. This untracked power usage is un-optimizable usage. Passive power consumption is considered to be the most significant drain of power on a power grid. Wall nuts and other passive power drains are undocumented and yet pull more current than any other sink. Even though an appliance is "off" doesn't mean that the appliance isn't consuming power. Tracking this passive power usage increases the user's 255 awareness of energy usage and creates opportunities to conserve overall energy.

In one embodiment of the present invention, an upgrade to energy manager 100 is accessed. For example, energy manager 100 may access, via server 225, upgrades to its functionalities and interoperability capacity with devices. In one embodiment, device 204 is upgraded within the home. Energy manager 100 may then access, via server 225, device 204's manufacturer to receive upgraded energy standards for device 204.

It is important to note that energy manager 100 may be a direct replacement for the heating-cooling thermostat controller that connects to the home air conditioner/heater. For example, a consumer may purchase energy manager 100, pull their current thermostat off their household wall, and mount energy manager 100 in its place. Energy manager 100 then performs all of the air conditioner/heater operations that would be expected from the displaced heating-cooling thermostat as well as the operations attributable to energy manager 100 described herein. Furthermore, a new face plate may include, but is not limited to, an increased display size, a faster processor within, added features to make energy manager 100 more user friendly.

Figure 3:
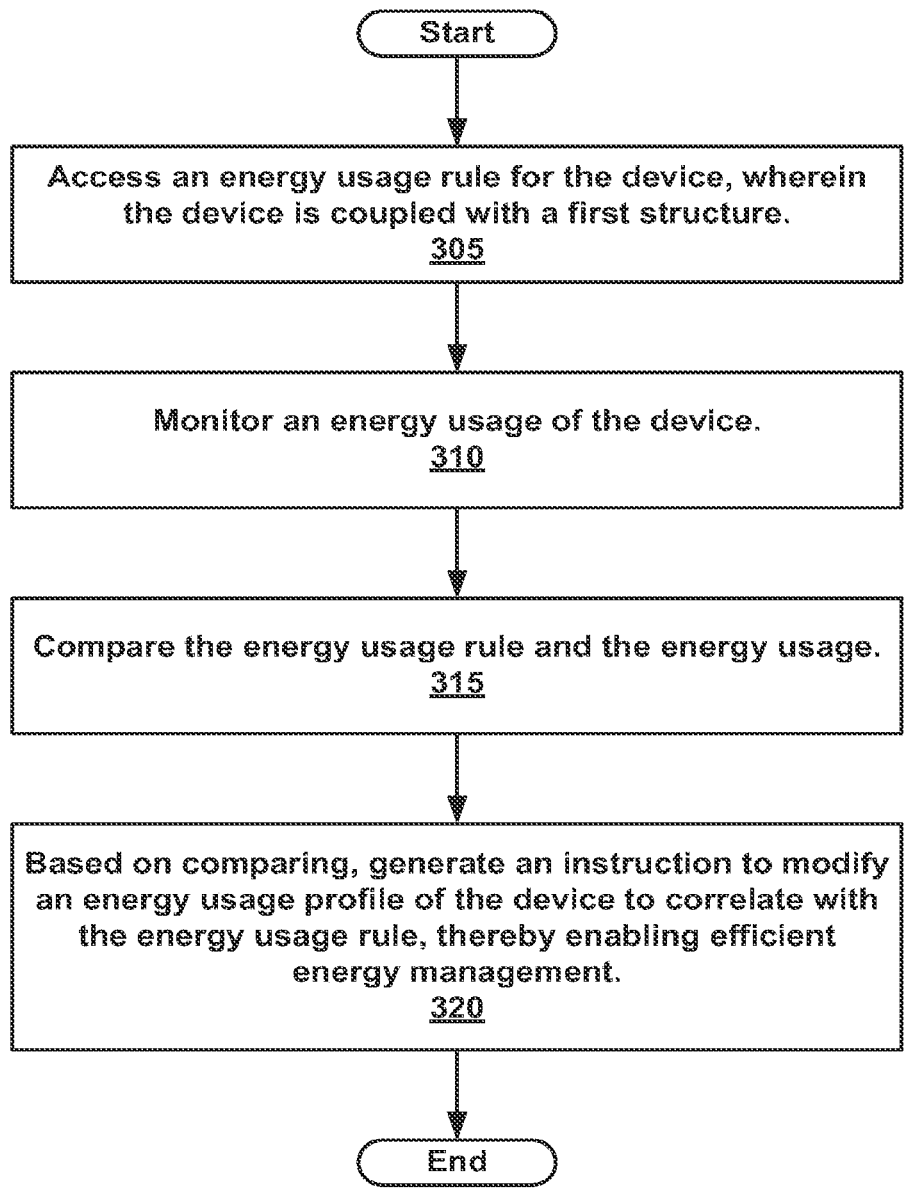
FIG. 3 is a flowchart of an example method of managing energy usage in accordance with embodiments of the present invention.

FIG. 3 is a flowchart 300 of an example method of managing energy usage. With reference now to 305 of FIG. 3, an energy usage rule 202 for device 204 is accessed, wherein device 204 is coupled with first structure 140.

With reference to 310 of FIG. 3, in another embodiment energy usage of device 204 is monitored. This monitoring may be automatically performed or upon command by user 255, energy utility 240, or some other authorized monitor. For example, a device's 204 energy usage may be monitored by energy utility 240 via energy measuring module 250b for inconsistencies in thermostat readings.

With reference to 315 of FIG. 3, in one embodiment, energy usage rule 202 is compared with the energy usage of device 202. Finally, with reference to 320 of FIG. 3, in one embodiment, based on 315 comparing of energy usage rule 202 and the energy usage of device 204, an instruction is generated to modify an energy usage profile of device 204 to correlate with energy usage rule 202, thereby enabling efficient energy management.

Thus, embodiments of the present invention enable the generation of an instruction for a user to modify an energy usage profile of one or more devices within a household to correlate to a desired energy usage for that device and/or household. Additionally, embodiments of the present invention enable the generation of an instruction to automatically modify an energy usage profile of one or more devices within a household to correlate to a desired energy usage for that device and/or household. Furthermore, an instruction to modify an energy usage profile for a device and/or household may be based on instructions from a user and instructions from a utility company via a server.

Example Computer System Environment

Figure 4:
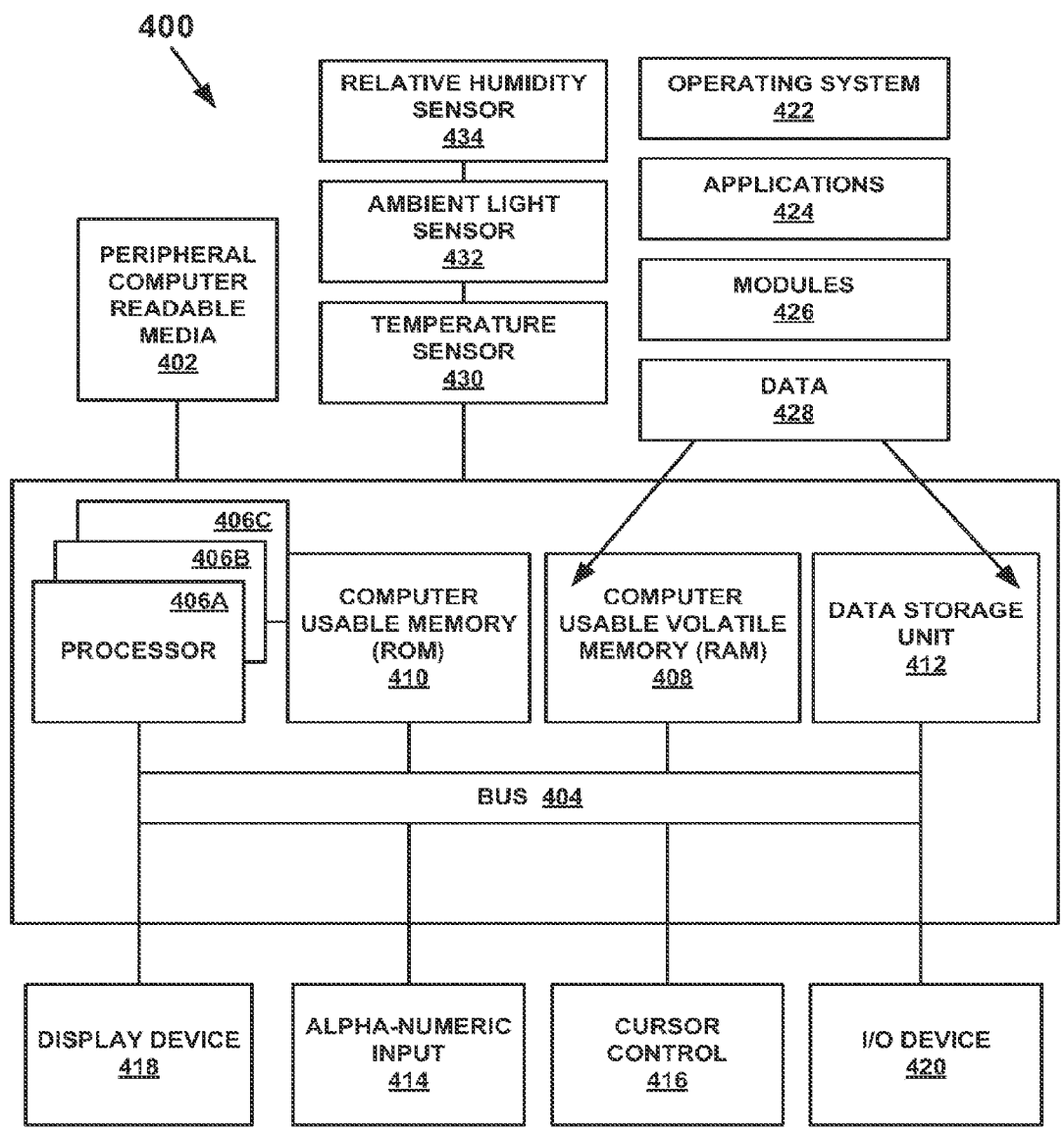
FIG. 4 is a diagram of an example computer system used for managing energy usage in accordance with embodiments of the present invention.

With reference now to FIG. 4, portions of the invention for generating a pre-recorded quick response are composed of computer-readable and computer-executable instructions that reside, for example, in computer-usable media of a computer system. That is, FIG. 4 illustrates one example of a type of computer that can be used to implement embodiments, which are discussed below, of the present invention.

FIG. 4 illustrates an example computer system 400 used in accordance with embodiments of the present invention. It is appreciated that system 400 of FIG. 4 is an example only and that the present invention can operate on or within a number of different computer systems including general purpose networked computer systems, embedded computer systems, routers, switches, server devices, user devices, various intermediate devices/artifacts, stand alone computer systems, and the like. As shown in FIG. 4, computer system 400 of FIG. 4 is well adapted to having peripheral computer readable media 402 such as, for example, a floppy disk, a compact disc, and the like coupled thereto.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present invention, for example, is stored as an application 424 or module 426 in memory locations within RAM 408 and memory areas within data storage unit 412. System 400 is also well suited to having a temperature sensor 430, an ambient light sensor 432, and a relative humidity sensor 434.

Computing system 400 is only one example of a suitable computing environment and is not intended to suggest any limitation as to the scope of use or functionality of the present invention. Neither should the computing environment 400 be interpreted as having any dependency or requirement relating to any one or combination of components illustrated in the example computing system 400.

The present invention may be described in the general context of computer-executable instructions, such as program modules, being executed by a computer. Generally, program modules include routines, programs, objects, components, data structures, etc., that perform particular tasks or implement particular abstract data types. The present invention may also be practiced in distributed computing environments where tasks are performed by remote processing devices that are linked through a communications network. In a distributed computing environment, program modules may be located in both local and remote computer-storage media including memory-storage devices.

FIG. 5 is a flowchart illustrating a process 500 for managing energy usage, in accordance with one embodiment of the present invention. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 500 is performed by energy manager 100 of FIG. 1.

With reference to 505 of FIG. 5, a signal of device 204 is monitored, wherein the signal is an energy usage signature specific to device 204 and device 204 is coupled with first structure 140. With reference to 510 of FIG. 5, an analysis of energy usage of device 204 is generated based on the monitoring of a signal of device 204. The analysis describes an energy usage profile of device 204.

In one embodiment, method 500 further comprises estimating savings with regards to replacing device 204 with a new device, wherein the estimating is based on the analysis described herein of method 500. For example, by installing energy manager 100, user 255 can get contextual advice on how to efficiently and affordably upgrade user's 255 current HVAC unit. Energy manager 100 estimates how much money would be saved by installing a new HVAC unit based on algorithms that do the following: measure, store, and analyze energy usage history; utilize a Seasonal Energy Efficiency Rating (SEER) of a new HVAC unit and how it would profile in the current household; and measure current HVAC unit run time and the temperature drop rate over various time intervals.

Energy manager 100 may, through its back-end server 225 connection in Internet 245, enable partnerships with local (or national) HVAC companies. Energy manager 100 may change its line-up of eligible replacement HVAC units based on factors such as pricing and availability in real-time. Energy manager 100 may provide contextual advertisement for HVAC unit vendors, or for any other product or service. The messaging from energy manager's 100 face-plate, connected PC interface, or connected mobile interface provides such useful information as, "You would save $130 per month if you upgraded to a Y SEER AC."

In yet another embodiment of the present invention, method 500 further comprises generating an analysis that informs user 255 of the costs associated with changing the settings of device 204. For example, energy manager 100 may generate an analysis that informs user 255 that changing the dishwasher to run at half power instead of at full power may save user 255 $20 per month.

In another embodiment, method 500 further comprises comparing the energy usage of first structure 140 with an energy usage of a second structure based on the analysis described herein of method 500. For example, with energy managers 100 in different homes, comparisons may be made between and among homes. A home in neighborhood N1 can compare its energy usage to a friend's home in neighborhood N2. Energy manager 100 may then relay to user 255 the following, "Your friend, Jim Smith, is spending $500 per month to heat/cool their house." Or, energy manager 100 may relay to user 255, "Your sister's fridge is costing $50 per month to keep the food cold, which is in the top 10% of homes in the nation in terms of effectiveness and efficiency." This neighbor comparison functionality works on competitive psychology. This functionality enables more sales of new and energy efficient units and overall electricity conservation for the power energy grid.

In another embodiment, method 500 further comprises alerting user 255 to specific maintenance tasks for device 204 that are recommended based on an analysis of energy usage of device 204 described herein. For example, method 500 comprises alerting user 255 that a new filter for device 204 is needed based on the analysis described herein of method 500. For example, energy manager 100 may estimate when enough time has passed based on overall usage to determine that a new filter for the HVAC unit is needed. Energy manager 100 may show reminders for replacing these HVAC filters. Energy manager 100 may show statistics on how much money is saved or lost by replacing or waiting to replace HVAC filters.

In another embodiment, method 500 further comprises calculating the efficiency of the HVAC correlated to the energy efficiency of the home (including insulation and air leakage through ducts, under doors, and around windows). For example, based on the duration that it takes to drop the temperature of the home to the desired temperature while taking into consideration the cost of electricity, energy manager 100 calculates the efficiency of the HVAC correlated to the energy efficiency of the home.

Similarly, energy manager 100 may calculate the current efficiency of an appliance such as a refrigerator. Utilizing an energy-measuring module 250a between the refrigerator and the electrical outlet, energy manager 100 can make algorithmic conclusions based on the setting and the history of the refrigerator. Thus, energy manager 100 may generate an analysis on the estimated energy efficiency of the refrigerator.

In another embodiment, method 500 further comprises alerting user 255 of a possible failure of device 204 based on an analysis of historical data or data on a remote server. This historical data includes the monitored energy usage data for device 204 described herein. Method 500 further comprises alerting user 255 of possible device 204 failure based on device's 204 history. For example, circuits sometimes begin to eat up larger and larger amounts of current or show erratic current draw before they fail. A "healthy history" of current usage per device 204 may be compared to current spikes or other erratic current draw to predict the failure of device 204.

In another embodiment, method 500 further comprises calculating the break even date of a replacement product. For example, energy manager 100 monitors the energy usage history for device 204. Then, after device 204 is replaced, energy manager 100 marks the replacement date. Energy manager 100 may then calculate the break even date and any realized savings based off of electric rate data. Energy manager 100 may then communicate these calculations to user 255 via graphical display module 215. Energy manager 100 may also communicate a victory notification to user 255.

In another embodiment, method 500 further comprises assisting user 255 with achieving a money savings goal by managing user's 255 energy usage. For example, a user's 255 financial savings goal and an interaction between user 255 and user's 255 device(s) 204 may result in a dialogue with device(s) 204 or even with the whole house. Energy manager 100 may also keep user 255 current on user's 255 financial savings. Energy manager 100 may tie its energy usage management of device(s) 204 with an incentive, such as, "By turning the AC up to 89 degrees, we are saving for our Fiji vacation.".

In another embodiment, method 500 further comprises querying and negotiating with user 255 to assist user 255 in meeting an energy budget target. For example, energy manager 100 may both interview and negotiate with user 255. The interviews may be periodic questions, posed through user-interfaces. These question posed may relate to personal comfort, and preferences on HVAC and energy automation effectiveness. For example, one question might be, "Are you cold, hot, or just right at this time?" The answer to this question will inform energy manager 100 of the threshold of environmental comfort for user 255 based on a registered temperature reading. Energy manager 100 may also poll user 255 if user 255 is the only one home or if other friends or relatives are at home to determine what actions should be taken.

Another possible question may be, "We made the assumption due to the time of day and the day in the month not to turn the heat on at this time in order to save you money . . . did you like this decision?" A positive response from user 255 will reinforce the algorithmic decision made. Whereas a negative response will provide the initiative to make a change.

The negotiation (via email, SMS, Instant Messaging, or directly accessing the interface of energy manager 100) of user 255 with energy manager 100 relates to trying to help user 255 hit a pre-set energy budget target. For example, if after 20 days into the month the user's 255 trend line is above the forecasted month end bill and/or energy usage, energy manager 100 may send user 255 an SMS messaging requesting permission to turn the heat down three degrees.

In another embodiment, method 500 further comprises profiling a device 204 based on the history of device 204 and environmental factors. For example, energy manager 100 may support the use of one energy-measuring module 250a used to connect device 204 to energy manager 100. Based on the energy consumption over time and against assorted environmental factors energy manager 100 will profile device 100 as to its energy consumption, energy costs, and as a percentage of room device class, and whole-home totals. This one energy-measuring module 250a may be rotated around the home to eventually construct a whole home energy profile, with or without the presence of energy-measuring module 250b.

Furthermore, this device-level energy audit can be conducted over varying levels of time and report to user 255 its higher level of confidence on its estimates based on the variable of time allowed to measure a particular device 204. Energy manager 100 may compare similar devices of its class via information on Internet hosted servers. Moreover, energy manager 100 may compare similar devices for the home via historical information from one or more energy utility 240. Energy manager may also make a forecast regarding device 204 based on company trends and forecasts.

In another embodiment, method 500 further comprises managing an energy co-op of a pool of energy manager 100 user(s) 255. For example, energy manager(s) 100 is able to aggregate homes within and across neighborhoods, grouping them into a logical large single pool. A logical large single pool of houses might be homes located geographically near each other. Energy manager 100 thus provides a distributed "buying block" of energy user's 255. This "buying block", having purchased from energy wholesalers, is able to act in a cooperative capacity as energy manager 100 user(s) 255. Beneficially, user(s) 255 would experience reduced energy costs. Server 225 may manage this co-op.

In yet another embodiment of the present technology, a plurality of energy usage signatures is aggregated by remote server 225. This plurality of energy usage signatures is compiled for comparison with subsequently received energy usage signatures. One or more of the energy usage signatures may be identified by user 255 of the device(s). In one embodiment, remote server 225 receives from user 255 of device 204 the identification information, including but not limited to device type, manufacturer, and model information to be associated with its energy usage signature. The server then aggregates this identification of device 204 in a database at server 225.

More particularly, energy manager 100 may detect a new energy usage signature within first structure 140. Energy manager 100 may notify user 255 that a new energy usage signature (device 204) exists and prompt user 255 for the device's identification. User 255 then may identify device 204 as washer model #4305. Energy manager 100 then sends this energy usage signature along with its identification to server 225. Remote server 255 stores this identification in a database that is accessible to users of device 204 and devices other than device 204. In this way, a database of energy usage signatures and related identifications is built and accessible by, but not limited to, users of various devices, manufacturers, and energy utility companies.

In another embodiment, the plurality of energy usage signatures of first structure 140 received by server 225 are provided for use and comparison of one or more energy usage signatures by an energy manager 100 in a second structure. For example, the energy usage signatures detected in structure 140 and their identification that is stored in a database at server 225 are provided to an energy manager 100 of a second structure for use and comparison with one or more energy usage signatures therein.

For example, energy manager 100 of a second structure uses the identified energy usage signatures associated with the devices in first structure 140 to identify the energy usage signatures detected in the second structure. In this manner, energy manager 100 takes advantage of a database of identifications of energy usage signatures located at a remote server in order to more quickly identify the devices within a household with which it is coupled. Of note, users of devices coupled with different structures provide assistance in the collection and identification of energy usage signatures for any number of devices.

Figure 6:
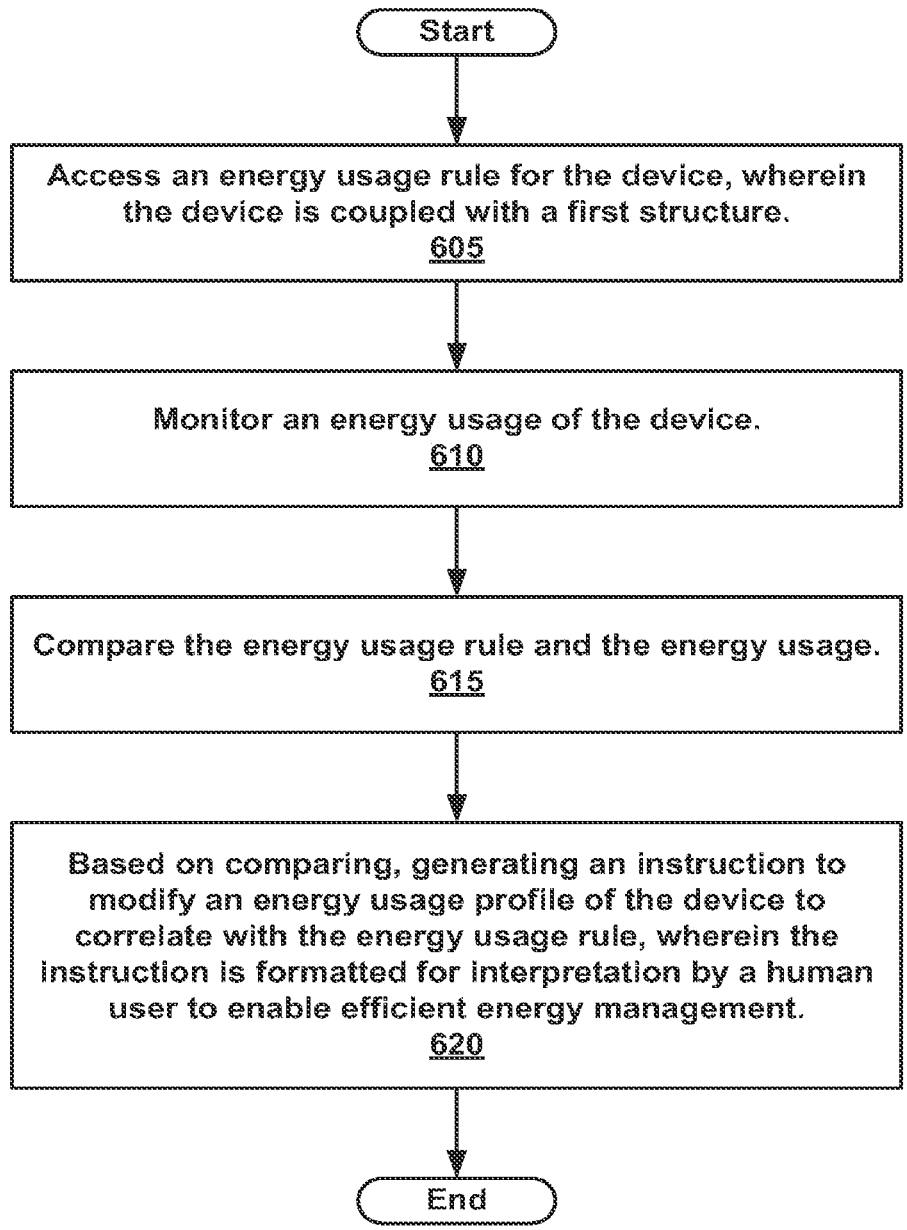
FIG. 6 is a flowchart of an example method of managing energy usage in accordance with embodiments of the present invention.

FIG. 6 is a flowchart illustrating a process for managing energy usage in accordance with embodiments of the present invention is shown. With reference now to 605 of FIG. 6, an energy usage rule 202 for device 204 is accessed, wherein device 204 is coupled with first structure 140.

With reference to 610 of FIG. 6, in another embodiment energy usage of device 204 is monitored. This monitoring may be automatically performed or upon command by user 255, energy utility 240, or some other authorized monitor. For example, a device's 204 energy usage may be monitored by energy utility 240 via energy measuring module 250b for inconsistencies in thermostat readings.

User 255 may access these instructions at, but not limited to, energy manager 100, at a device coupled with first structure 140, at a server 255 coupled with energy manager 100 and/or first structure 140, and/or at a device at a second structure coupled wired or wirelessly with first structure 140.

With reference to 615 of FIG. 6, in one embodiment, energy usage rule 202 is compared with the energy usage of device 202. Finally, with reference to 620 of FIG. 6, in one embodiment, based on 615 comparing of energy usage rule 202 and the energy usage of device 204, an instruction is generated to modify an energy usage profile of device 204 to correlate with energy usage rule 202, wherein the instruction is formatted for interpretation by a human user, thereby enabling efficient energy management. An instruction is formatted for interpretation by a human user if the instruction is transmitted in such a way that it could be understood by a human user.

Thus, embodiments of the present invention enable the generation of an instruction for a human user to modify an energy usage profile of one or more devices within a household to correlate to a desired energy usage for that device and/or household. Additionally, embodiments of the present invention enable the generation of an instruction to automatically modify an energy usage profile of one or more devices within a household to correlate to a desired energy usage for that device and/or household.

Thus, embodiments of the present invention increase consumer awareness as to conservation of energy by enabling the generation of an analysis of a device's energy usage. In one embodiment, the analysis informs a consumer of estimated savings with regards to replacing a device with a new device. In another embodiment, the analysis provides a comparison of the energy usage and energy costs of two different households. Furthermore, embodiments of the present invention inform a consumer when a new filter for a device is needed based on a generated analysis. Thus, embodiments of the present invention are beneficial by increasing a consumer's awareness of energy conservation opportunities.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of preconditioning a temperature of an enclosure, comprising:
    storing a schedule of temperature setpoints in a storage module communicatively coupled with a thermostat operatively coupled to an HVAC (heating, ventilation, and air conditioning) system that provides heating and/or cooling at the enclosure, the schedule including a plurality of specific times and a desired temperature setpoint for the enclosure for each specific time, the desired temperature setpoint indicating a desired temperature of the enclosure;
    identifying, by an energy management module, an area that includes the enclosure;
    transmitting, by the energy management module, a request for weather information for the area;
    receiving, by the energy management module, data indicating a future weather prediction for the area in response to the request;
    identifying, by the energy management module, a specific time from the plurality of specific times in the stored schedule that will be affected by the future weather prediction;
    generating, by the energy management module, a new schedule of temperature setpoints based on a modification of the stored schedule of temperature setpoints, the new schedule of temperature setpoints including:
        a temperature setpoint moved in time, the temperature setpoint moved in time being a first desired temperature setpoint of the schedule of temperature setpoints moved forward in time so as to be set at one of the specific times that is earlier in time than the one of the specific times for which the first desired temperature setpoint was set prior to being moved in time; and
    operating the HVAC system at the enclosure in accordance with the new schedule of temperature setpoints.

2. The method of claim 1, further comprising:
    receiving occupancy information for the enclosure, the occupancy information indicating a number of occupants inside the enclosure,
    wherein the new schedule of temperature setpoints is generated based on the occupancy information.

3. The method of claim 1, further comprising:
    storing a history of occupancy information for the enclosure, the history of occupancy information indicating a number of occupants inside the enclosure at specific times of a day, wherein a daily occupancy pattern is created for the enclosure using the history of occupancy information and is used for generating the new schedule of temperature setpoints.

4. The method of claim 1, wherein the second desired temperature setpoint of the schedule of temperature setpoints is decreased in desired temperature when the future weather prediction includes expected high temperature.

5. The method of claim 1, wherein the second desired temperature setpoint of the schedule of temperature setpoints is increased in desired temperature when the future weather prediction includes expected low temperature.

6. The method of claim 1, wherein the new schedule of temperature setpoints is generated based on a season of year.

7. The method of claim 1, further comprising:
    receiving a rate schedule including a plurality of time periods and a per unit energy price corresponding to each time period,
    wherein the new schedule of temperature setpoints is generated based on the rate schedule.

8. The method of claim 1, further comprising:
    receiving a peak time indicating when a peak demand is expected on a local utility grid covering the enclosure,
    wherein the new schedule of temperature setpoints is generated based on the peak time.

9. The method of claim 1, wherein the future weather prediction is received over the Internet.

10. The method of claim 1, wherein the request for weather information includes an address of the enclosure.

11. The method of claim 10, wherein the address includes at least a zip code.

12. A system for preconditioning a temperature of an enclosure, comprising:
    a storage module configured to store a schedule of temperature setpoints, the schedule including a plurality of specific times and a desired temperature setpoint for the enclosure for each specific time, the desired temperature setpoint indicating a desired temperature of the enclosure;
    a thermostat control module operatively coupled to an HVAC unit that provides heating and/or cooling at the enclosure; and
    an energy management module communicatively coupled to the storage module and the thermostat control module and configured to:
        identify an area that includes the enclosure,
        transmit a request for weather information for the area,
        receive data indicating a future weather prediction for the area in response to the request,
        identify a specific time from the plurality of specific times in the schedule that will be affected by the future weather prediction,
        generate a new schedule of temperature setpoints based on a modification of the stored schedule of temperature setpoints, the new schedule of temperature setpoints including:

a temperature setpoint moved in time, the temperature setpoint moved in time being a first desired temperature setpoint of the schedule of temperature setpoints moved forward in time so as to be linked with one of the specific times that is earlier in time than the one of the specific times for which the first desired temperature setpoint was linked prior to being moved in time, and transmit a signal to the thermostat control module, the signal causing the thermostat control module to operate the HVAC unit in accordance with the new schedule of temperature setpoints.

13. The system of claim 12, further comprising:

a user interface communicatively coupled to the energy management module and configured to:

receive user input from a user of the enclosure, the user input including a desired temperature of the user, and transmit the user input to the energy management module;

wherein the energy management module is further configured to:

generate the schedule of temperature setpoints based on the user input, and transmit the schedule of temperature setpoints to the storage module for storing.

14. The system of claim 13, wherein the energy management module is further configured to communicate a query to the user of the enclosure via the user interface, the query regarding the temperature of the enclosure, and wherein the user input is a response to the query.

15. The system of claim 13, wherein the energy management module is further configured to identify a time of when the user input is received, and wherein generating the schedule of temperature setpoints is further based on the identified time of when the user input is received.

16. The system of claim 13, wherein the energy management module is further configured to transmit the user input to the storage module for storing, and identify a pattern from a plurality of user inputs stored on the storage module, and wherein the energy management module generates the schedule of temperature setpoints based on the pattern.

17. The system of claim 13, wherein the user interface is a voice user interface.

18. The system of claim 13, wherein the user interface is a graphical user interface.

19. A non-transitory computer-readable medium, having instructions stored therein, which when executed cause a computer to perform a set of operations comprising:

storing a schedule of temperature setpoints in a storage module, the schedule including a plurality of specific times and a desired temperature setpoint for an enclosure linked with each specific time, the desired temperature setpoint indicating a desired temperature of the enclosure;

identifying an area that includes the enclosure;

transmitting a request for weather information for the area;

receiving data indicating a future weather prediction for the area in response to the request;

identifying a specific time from the plurality of specific times in the stored schedule that will be affected by the future weather prediction;

identifying occupancy information for the enclosure, generating a new schedule of temperature setpoints based on a modification of the stored schedule of temperature setpoints and the occupancy information, the new schedule of temperature setpoints including:

a temperature setpoint moved in time, the temperature setpoint moved in time being a first desired temperature setpoint of the schedule of temperature setpoints moved forward in time so as to be for one of the specific times that is earlier in time than the one of the specific times for which the first desired temperature setpoint was for prior to being moved in time; and operating an HVAC unit that heats and/or cools the enclosure in accordance with the new schedule of temperature setpoints.

20. The non-transitory computer-readable medium of claim 19, having further instructions stored therein, which when executed cause the computer to perform a set of operations comprising:

generating a notification regarding operating the HVAC unit in accordance with the new schedule of temperature setpoints; and transmitting the notification to a mobile device of a user of the enclosure.

* * * * *